April 13, 1937.  D. E. WEBSTER  2,076,833
ABRASIVE ARTICLE
Filed April 13, 1935
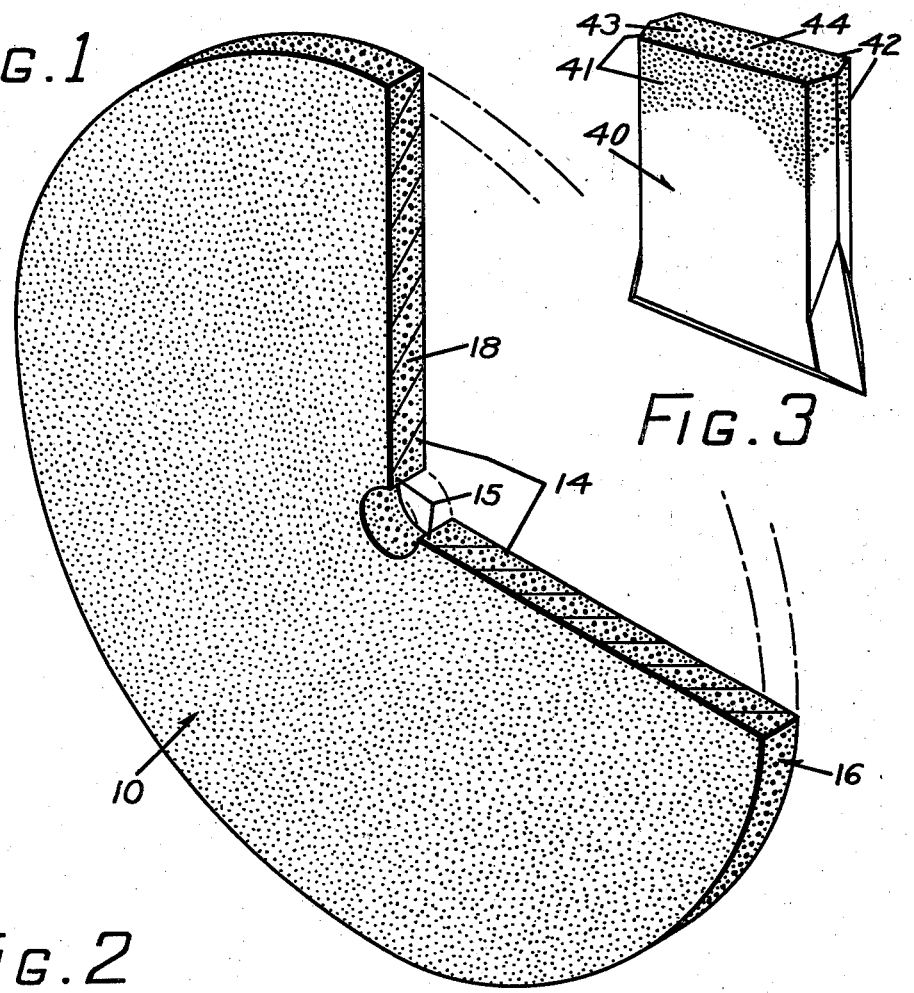
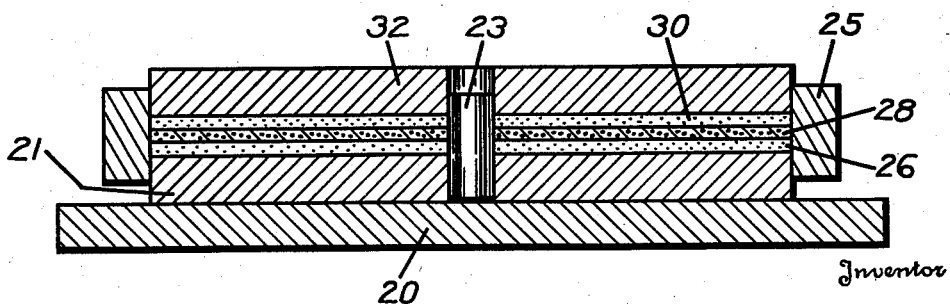
WITNESSES
Franklin E. Johnson
Edward H. Goodrich
Inventor
DUANE E. WEBSTER
By Clayton L. Jenks
Attorney Patented Apr. 13, 1937

2,076,833

UNITED STATES PATENT OFFICE 2,076,833

ABRASIVE ARTICLE

Duane E. Webster, Worcester, Mass., assignor to Norton Company, Worcester, Mass., a corporation of Massachusetts Application April 13, 1935, Serial No. 16,212

8 Claims. (Cl. 51—206)

This invention relates to an abrasive article, and particularly to a thin, rough-sided cutting-off grinding wheel and also to sectors or segments, such as bonded abrasive saw teeth, arranged to be mounted on a rotary support and adapted to be employed in the nature of a rotary saw for producing deep, narrow grooves or cutting off lengths of work.

Very thin, flat-sided, bonded abrasive wheels, commonly referred to as cutting-off grinding wheels, are now being employed for many cutting operations which were formerly accomplished with rotary steel saws. It is well known that a grinding wheel of this type is capable of performing a much more efficient and rapid peripheral cutting operation than a rotary saw. Furthermore, a cutting-off grinding wheel is capable of rapidly cutting various extremely hard materials, such as quartz and certain alloy steels which cannot be cut with a steel saw. These cutting-off wheels may comprise wheels as small as a very few inches in diameter and only a few thousandths of an inch in thickness, or they may be 20 inches or more in diameter and ⅛ of an inch or less in thickness.

Cutting-off abrasive wheels, when operated at their maximum cutting efficiency, are often rotated at a surface speed as high as 16,000 surface feet per minute. Although a grinding wheel rotating at this high surface speed is capable of a fast cutting operation, the rapidity of such a cutting operation cannot be maintained at the maximum peripheral cutting ability of the wheel since this high rotational speed usually results in an excessive frictional heat of grinding. These wheels offer an insufficient opportunity for the dissipation of this heat of grinding, with the consequent result that they frequently have their bonding material softened, thereby permitting the abrasive grains embedded therein to tear loose and altering the grinding characteristics of the wheel. This excessive heat of grinding also causes frequent wheel warpage, resulting in breakage of the wheel, causing damage to the work and endangering the machine operator. Grinding wheels of this type, when operated at high speeds, are relatively fragile bodies which are easily broken if subjected to any transverse pressures. Consequently, even if a wheel of this type were permitted to bind slightly or to vibrate within the work during a cutting-off operation, it would become broken.

Furthermore, these smooth-sided wheels offer insufficient opportunity for clearance and removal of ground particles from the work cut with the result that these particles often become wedged between the sides of the cut and the wheel faces, causing excessive friction between the wheel and the work which usually results in breakage. These thin wheels have also been found to wear away most rapidly at their peripheral edges and after a few grinding operations they have become wedge shaped, gradually increasing in thickness from their periphery to the central portion of the wheel. A grinding wheel worn in this manner produces a wholly unsatisfactory cut which is not perpendicular to the axis of wheel rotation, and the wheel tends to bind within its cut and become easily broken.

In an endeavor to provide a cutting-off grinding wheel capable of being operated at its maximum peripheral cutting capacity, various different shapes of grinding wheels have been employed. It has been contemplated to provide a cutting-off wheel having side faces which tapered from its periphery to the central portion of the wheel to relieve any possibility of the wheel binding within its cut. However, due to the fragile nature of such grinding wheels, it has been found necessary to make them much thicker, resulting in a consequent slower cutting operation and a wastage of material. It has further been contemplated to provide spaced grooves or depressed portions in the opposed side wheel faces in an attempt to aid in cooling a cutting-off wheel during a grinding operation, but such constructions have not aided the cutting ability of the wheel sufficiently to compensate for the weakening effect on the wheels which caused frequent breakage thereof.

It has been further contemplated to provide a grinding wheel composed of a plurality of peripherally spaced bonded abrasive sectors removably clamped to rotatable metal hub in such a manner that each sector serves as a saw tooth and the entire assembly serves in the nature of a rotary saw adapted to produce deep, narrow grooves or cut off lengths of work. However, these saw teeth have been provided with smooth side faces which were unable to produce sufficient abrading action to clear the saw within the work cut and permit the saw to cut at its maximum peripheral abrading ability.

It is, therefore, the primary object of this invention to provide a rough sided abrasive article especially adapted to provide simultaneous grinding operations with its periphery and side face, which is so constructed that the wheel periphery and rough side faces are provided with predetermined grinding properties which are independent of each other.

It is a further object of this invention to provide a very thin rough sided abrasive wheel adapted to be employed as a rotary saw for cutting deep grooves or cutting off lengths of work and which is arranged to produce predetermined grinding operations with its periphery and opposed rough side faces at the same time and in such a manner that the wheel may be safely operated at its maximum peripheral cutting ability to accomplish a rapid, cool cutting operation.

It is a still further object of this invention to provide a bonded abrasive saw tooth arranged to be removably clamped with similar teeth to a rotatable support and adapted to be used therewith as a rotary saw for cutting deep, narrow grooves or cutting off lengths of work and which is arranged to produce predetermined but independent grinding actions simultaneously with its periphery and opposed rough sides.

It is also an object of this invention to provide a method of producing a bonded abrasive article having side faces of desired roughness and abrading ability irrespective of the composition and abrading characteristics of the main body portion of the article.

In the drawing:

Fig. 1 is a perspective view of a cutting-off grinding wheel, which is partly broken away to illustrate the preferred embodiment of my invention;

Fig. 2 shows a method of producing my preferred type of grinding wheel; and

Fig. 3 shows a bonded abrasive saw tooth arranged to be employed in the periphery of a rotary saw.

My preferred type of cutting-off grinding wheel comprises a main body portion of suitable organic bonded abrasive grains having its side wheel faces composed of layers or coatings of abrasive grains secured thereon in such a manner as to provide closely spaced, sharp, free cutting, exposed abrasive teeth projecting therefrom. These layers of projecting abrasive grains forming the rough side wheel faces are integrally secured to the main body portion of the wheel by the bond of the body portion of the wheel and these grains may be of any suitable material, shape and size, irrespective of the abrasive material employed in the body wheel portion. Side wheel faces of desired roughness and abrading properties may be easily provided by employing a suitable pressing or molding operation to partially embed these layers of abrasive grains into either one or both of the sides of the wheel before the bond has been completely matured. Hence, it will be appreciated that the same bonding material is employed throughout the entire wheel structure and either one or both side wheel faces are composed entirely of projecting abrasive cutting edges which provide wheel sides of any desired grinding characteristics irrespective of the abrading properties of the main body portion of the wheel which determines the peripheral cutting ability thereof.

As illustrated in Figs. 1 and 2 of the accompanying drawing, my preferred form of invention comprises a laminated disk type of cutting-off grinding wheel 10 having two opposed side faces 14 and 15 of predetermined roughness and grinding characteristics and composed of a large number of closely spaced, sharp abrasive teeth which project from the sides of the main body portion of the wheel. The wheel is further provided with a peripheral grinding face 16 which is very narrow in comparison to its diameter. The main body portion of the grinding wheel comprises a thin, disk shaped grinding member 18 composed of bonded abrasive grains, such as crystalline alumina, silicon carbide, or other suitable abrasive grains of desired shape and size secured into an annular grinding member by a suitable matured bond, and particularly an organic bond, such as rubber, shellac, natural resins, or various synthetic resinoids including the well known phenolic condensation products and glycerol resins as are commonly employed in this art.

The rough operative side wheel faces 14 and 15 are composed of layers or coatings of granular abrasive material projecting from the sides of the wheel body 18 and integrally secured thereto by the bond employed within the main body portion of the wheel. These side faces may be of a predetermined roughness and cutting ability and they may comprise closely spaced, sharp abrasive grains, such as crystalline alumina, silicon carbide, diamonds, boron carbide known by the formula $B_4C$, or other suitable abrasives. It is ordinarily desirable that the abrasive grains forming these rough side wheel faces be composed of a harder material than that of the abrasive within the main body portion of the wheel so that the side wheel faces will cut at a sufficiently fast rate to clear the wheel within the work cut and aid in providing a cool, fast cutting wheel.

These abrasive coatings forming the rough side wheel faces are preferably applied by placing layers of loose, granular abrasive material of required size, shape and composition upon the opposed side faces of a preformed body of abrasive grains secured together by an unmatured organic bond, and thereafter applying heat and pressure to the layers of loose abrasive to embed them within the opposed sides of the preformed body and mature the bond to provide an integral grinding member having side faces of desired roughness and cutting ability irrespective of the abrading properties of other portions of the grinding member.

One convenient method of producing my preferred type of grinding wheel is illustrated in Fig. 2. A rigid bed 20 is arranged to evenly support an annular press plate 21 and a hub 23 which is slidably mounted within a central hole in the press plate. A retaining ring 25 slidably and frictionally engages the periphery of press plate 21 and is coaxial with hub 23. A layer of loose abrasive grains 26 of suitable material, size and shape is spread over the entire top surface of press plate 21 between retaining ring 25 and hub 23. The top of the layer of loose abrasive material 26 is carefully smoothed off by means of any suitable tool so that it presents a level supporting surface. A suitable preformed, flat faced, annular grinding body 28 adapted to slidably fit between ring 25 and hub 23 and comprising a mixture of abrasive grains and an unmatured bond such as an organic bonding material is then placed upon the layer of loose abrasive grains 26. A similar layer of suitable loose abrasive grains 30 is spread over the upper face of the annular body 28 and the top of this layer of grains is smoothed off so that it presents a level supporting surface.

A disk shaped top press plate 32, slidably engageable with hub 23 and retaining ring 25, is then placed upon the upper layer of loose abrasive grains 30. Sufficient heat is applied to the assembly to soften the bond within the annular abrasive body 28 and sufficient pressure is applied to top press plate 32 so that the loose abrasive grains within layers 26 and 30 which contact therewith will be evenly pressed against and partially embedded within the opposed side faces of member 28. By varying the pressure on press plate 32, the opposed layers of loose abrasive grains may be embedded within member 28 to any desired extent. In some instances, it has been found that the weight of press plate 32 alone is sufficient to partially embed the abrasive grains contacting with the opposed wheel sides and provide the desired rough side wheel faces. Further application of heat serves to mature the wheel bond. When member 28 is removed from the mold upon completion of the heat setting operation, it comprises an integral grinding wheel structure having the main body portion 18 provided with rough side faces 14 and 15 which are composed of layers of partially embedded abrasive material formed of closely spaced, sharp, projecting abrasive grains.

It will be appreciated that in this type of grinding wheel, rough side faces may be provided having any desired cutting ability irrespective of the cutting ability of the main body portion of the wheel which determines its peripheral grinding properties. Furthermore, a grinding wheel having only one rough side wheel face may be provided by eliminating the layer of loose abrasive grains 30 and placing press plate 32 in contact with the annular abrading member 28. Hence, the side faces of my grinding wheel may be arranged to abrade the work at a rate which is sufficiently rapid to provide a cutting-off grinding wheel capable of being fed into the work at its maximum peripheral cutting capacity without any danger of overheating the wheel or causing it to bind within the work.

A modified form of my invention, as illustrated in Fig. 3 of the accompanying drawing, comprises a laminated type of bonded abrasive saw tooth 40 provided with two opposed side faces 41 and 42 having a predetermined roughness and cutting ability and composed of layers of closely spaced abrasive grains provided with exposed, sharp, free cutting edges projecting from the body portion of the saw tooth and a narrow peripheral cutting face 43. The saw tooth may be of any suitable size and shape and removably fastened to a disk shaped, rotatably mounted support in peripheral spaced relation to other similar bonded abrasive teeth, as shown in my copending application Serial No. 716,517 and in the U. S. patent to Peirce No. 1,063,380, to perform a required cutting operation. My saw tooth is further provided with a suitably shaped clamping base comprising wedge shaped, dovetailed faces which provide gripping portions at the lower end of the tooth adapted to mate with suitably shaped clamping faces on a disk shaped, rotatable support whereby the tooth may be rigidly and removably clamped in position to rotate with its support.

The main body portion of the tooth 40 is composed of a bonded abrasive grinding member 44 comprising abrasive grains, such as crystalline alumina, silicon carbide or other granular abrasive of suitable size and shape, secured into the desired form of a saw tooth having a clamping base by a suitable matured organic bond, such as rubber, shellac, natural resins or the various synthetic resinoids including the phenolic condensation products and the glycerol resins as are well known in this art. The opposed, rough, operative, side tooth faces 41 and 42 are composed of layers or coatings of granular abrasive material projecting from the sides of the tooth body 44 and integrally secured thereto by the bond of the main body portion of the saw tooth.

These abrasive side faces, which are of a predetermined roughness and cutting ability, are composed of closely spaced, sharp abrasive grains, such as crystalline alumina, silicon carbide, diamonds, boron carbide known by the formula $B_4C$, or other suitable granular abrasive materials. These granular coatings are provided with different grinding characteristics from the grains in the body portion of the saw tooth and they preferably comprise a different material to form side operative faces of desired roughness and cutting properties which prevent binding of the saw teeth within the work cut and abrade the sides thereof sufficiently to aid in providing a cool, fast cutting operation. My saw tooth may have rough, opposed operative side faces composed of suitable layers of sharp abrasive grains applied thereon in the same method as heretofore described with relation to my preferred type of invention.

Various modifications in structure and methods of manufacture will be apparent to one skilled in the art, and the claims presented in this case are to be interpreted broadly within the scope of my disclosure.

Having thus described my invention, what I claim as new and desire to secure by Letters Patent is:

1. An abrasive article comprising a main body portion of an organic bond and abrasive grains having a grinding face and a rough side face, the latter being composed solely of a surface layer of abrasive grains partially imbedded within said bond and having different abrading characteristics from the abrasive grains within the body portion and providing sharp abrasive teeth projecting from the sides of the article.

2. A grinding wheel comprising a disk shaped main body portion of an organic bond and abrasive grains having a peripheral grinding face and opposed side wheel faces of predetermined roughness and different grinding characteristics from that of the wheel periphery, each of said side wheel faces being composed solely of a coating of abrasive grains partially imbedded within the wheel bond and protruding therefrom as exposed, sharp, free cutting abrasive teeth.

3. An abrasive article comprising a main body portion of an organic bond and abrasive grains and a rough side face thereon composed solely of abrasive grains partially embedded in said bond and projecting from the side of the main body portion as exposed spaced abrasive teeth, the grains in said side face being of a harder material than the abrasive grains within the body portion.

4. A cutting-off grinding wheel comprising a disk shaped body portion of an organic bond and abrasive grains which is very thin in comparison with its diameter, and opposed rough side wheel faces thereon composed solely of layers of abrasive grains partially embedded in said bond and projecting from the wheel sides, said layers of grains being of a different material from that of the abrasive grains within the main body portion of the wheel and forming exposed, sharp and free cutting abrasive teeth.

5. A cutting-off grinding wheel comprising a disk shaped central body portion of abrasive grains and a bond which is very thin in comparison to its diameter, and opposed side wheel faces composed solely of sharp abrasive grains partially embedded in said bond and projecting from the sides of the central wheel portion, said grains being of a harder material than the abrasive of the body portion and providing side wheel faces of predetermined grinding characteristics different from those of the central body portion of the wheel.

6. An abrasive article comprising a central body portion of abrasive grains other than silicon carbide and an organic bond uniting the grains as an integral structure having a narrow peripheral grinding face, and opposed rough side faces of predetermined cutting ability composed solely of granular silicon carbide partially embedded in and integrally secured to the bond within the body portion and providing closely spaced, exposed, sharp, free-cutting edges projecting from the sides of the article.

7. An abrasive article comprising a main body portion of an organic bond and abrasive grains other than boron carbide which has a narrow peripheral grinding face, and opposed side faces of predetermined roughness and cutting ability composed solely of granular boron carbide partially embedded in and integrally secured to the sides of the body portion by the organic bond thereof and providing a multiplicity of exposed, sharp, free-cutting, minute projecting abrasive teeth which have abrading characteristics different from those of the main body portion.

8. An abrasive saw tooth comprising a clamping base and a main body portion of an organic bond and abrasive grains having a peripheral grinding face and opposed side faces, the latter being composed solely of closely spaced abrasive grains of a different material from that within the main body portion which are partially embedded in said bond and provide a multiplicity of exposed, sharp, free-cutting abrasive edges projecting from the body portion of the tooth.

DUANE E. WEBSTER.